(12) United States Patent
Stuart et al.

(10) Patent No.: US 6,430,921 B1
(45) Date of Patent: Aug. 13, 2002

(54) SYSTEM MOISTURE ABSORBER

(75) Inventors: John W. Stuart, Romeoville, IL (US); Michael J. Eifert, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/834,081

(22) Filed: Apr. 12, 2001

(51) Int. Cl.⁷ .................................................. F01N 3/02
(52) U.S. Cl. ........................ 60/309; 181/258; 181/259
(58) Field of Search .......................... 60/281, 309, 324; 181/244, 245, 258, 259, 260, 261, 282

(56) References Cited

U.S. PATENT DOCUMENTS

| | | | |
|---|---|---|---|
| 2,732,913 A | * | 1/1956 | Higgins ........................ 60/324 |
| 2,761,525 A | * | 9/1956 | Moss ........................... 181/282 |
| 2,921,432 A | * | 1/1960 | Marcotte et al. .............. 60/309 |
| 3,630,030 A | | 12/1971 | Wagner |
| 4,026,381 A | * | 5/1977 | Conley ........................ 181/244 |
| 4,393,652 A | * | 7/1983 | Munro ......................... 60/309 |
| 4,402,714 A | * | 9/1983 | Fethke et al. ............... 181/244 |
| 4,541,240 A | * | 9/1985 | Munro ......................... 60/309 |
| 4,610,700 A | * | 9/1986 | Miller et al. ................ 181/245 |
| 4,947,957 A | * | 8/1990 | Cullen et al. ............... 181/258 |
| 5,321,215 A | | 6/1994 | Kicinski |
| 5,348,562 A | | 9/1994 | Burrous |
| 5,808,245 A | | 9/1998 | Wiese |

FOREIGN PATENT DOCUMENTS

| | | | |
|---|---|---|---|
| JP | 6-33756 | * | 2/1994 |

* cited by examiner

*Primary Examiner*—Thomas Denion
*Assistant Examiner*—Tu M. Nguyen
(74) *Attorney, Agent, or Firm*—Jeffrey P. Calfa; Neil T. Powell; Dennis Kelly Sullivan

(57) ABSTRACT

An exhaust system for an internal combustion engine has special accommodations for preventing the pooling of water in the passageways of the exhaust system. One or more of the components of the exhaust system such as mufflers and or sections of exhaust tubing etc. have absorbent liners disposed at points within said exhaust system where water is likely to pool. The absorbent liners wick moisture away from the inner surfaces of the exhaust components in which they are disposed. Moisture is held within the absorbent liners until the temperature of the exhaust system rises enough to evaporate the moisture at which time the water vapor exits the exhaust system with the combustion products of the internal combustion engine. The absorbent liners are of a size and shape and are positioned within the exhaust system components such that they present minimal restriction to flow of combustion products through the exhaust system.

14 Claims, 4 Drawing Sheets

SYSTEM MOISTURE ABSORBER

BACKGROUND OF THE INVENTION

This invention relates to exhaust systems for scavenging combustion products of an internal combustion engine. Exhaust systems for internal combustion engines are generally comprised of exhaust passageways for routing the combusted gases away from the engine. The passageways of the exhaust system are defined by the components of the exhaust system. The types of components which comprise exhaust systems include but are not limited to sections of exhaust tubing, mufflers, catalytic converters, and manifolds all of which are well known in the art. Most components of exhaust systems are often made of materials, which are susceptible to corrosion.

Water often enters and collects in the passageways of these exhaust systems. This water can be introduced into the passageways in any number of ways. Water vapor is a product of the combustion process of many internal combustion engines. When the exhaust system is cool the water vapor in the combustion products often condenses and collects in the passageways of the exhaust system. Water from the atmosphere also enters the passageways of the exhaust system in inclement weather. This is especially true for exhaust systems that have a vertical passageway adjacent the point where exhaust gases exit the exhaust system. When the internal combustion engine is operated for a substantial period of time the temperature of the components of the exhaust system becomes high enough to evaporate any pooled water within the exhaust system. The water vapor then exits the exhaust system with the combustion gases, leaving the internal passageways of the exhaust system substantially dry. The passageways of the exhaust system remain dry until water enters the exhaust system from the atmosphere or the internal combustion engine is run for a relatively short period of time and water vapor from the combustion process condenses in the passageways.

The pooling of water in the passageways of the exhaust system, which can occur between times when the internal combustion engine is run for a substantial period of time, can cause a number of problems. During the times when water is pooled in the passageway of the exhaust system accelerated corrosion occurs at the places where the water is pooled. Pooled water can also leak from joints between components of the exhaust system and carry with it soot, end products of corrosion and other substances, which leave unsightly deposits on the exterior of the exhaust system. Finally, pooled water, along with the above mentioned soot and other offensive substances, is often sprayed from the exit point of the exhaust system upon initial operation of the internal combustion engine.

PRIOR ART

Various different exhaust system designs have been utilized in the past in attempts to reduce the pooling of water in the passageways of the exhaust system. Exhaust systems with devices for separating water droplets from the flow of exhaust gases and subsequently diverting those water droplets out of the exhaust system passageways are disclosed in U.S. Pat. Nos. 3,630,030 and 5,348,562. Exhaust systems with structure for draining water from the passageways of the exhaust system are disclosed in U.S. Pat. Nos. 5,321,215 and 5,808,245.

SUMMARY OF INVENTION

As a result,—an object of the present invention is to provide an exhaust system for an internal combustion engine which reduces the pooling of water in the passageways of the exhaust system. The present invention is a component for an exhaust system for an internal combustion engine, the exhaust system itself, and a vehicle to which the internal combustion engine and the exhaust system is engaged. According to the present invention a component of an exhaust system for an internal combustion engine has an absorbent liner disposed within a passageway defined by the component. The component for the exhaust system may be a muffler, a portion of exhaust tubing, a catalytic converter, or any other component of such an exhaust system in which such an absorbent liner could be disposed.

The absorbent liner of the present invention would be comprised of a material, which absorbs moisture (especially water). Wicking action occurs in the absorbent liner of the present invention such that moisture that is absorbed is drawn away from the point of contact between the absorbent liner and distributed throughout the absorbent liner. The absorbent liner is disposed within the passageways of the exhaust system at a point where water might otherwise pool. As water collects in the exhaust system of the present invention, any water that comes into contact with the absorbent liner is drawn into the absorbent liner until the absorbent liner is saturated. This prevents water from pooling in the area of the passageways of the exhaust system surrounding the absorbent liner until the absorbent liner is saturated. Because the absorbent liner draws moisture away from interior surfaces of the exhaust passageways, the inclusion of the absorbent liner tends to increase the life of the exhaust system by reducing corrosion of the exhaust system. When the internal combustion engine is operated for a substantial period of time, the temperature of the exhaust system, including the absorbent liner, rises substantially. Once the temperature of the exhaust system reaches a certain level any water within the exhaust system, including that contained in the absorbent liner, vaporizes over a period of time and is exhausted with the combustion products. Any water contained within the absorbent liner is also prevented from leaking out of the exhaust system at joints between components of the exhaust system and staining the exterior of the exhaust system. Water contained within the absorbent liner is also held in the liner even as combustion products travel through the exhaust system at substantial flow rates. Upon operation of the internal combustion engine, any water which is contained within the absorbent liner, is, thus, not sprayed from the exit point of the exhaust system as it often would be if it were allowed to pool in the exhaust system. It can thus be seen that the above mentioned object as well as others not mentioned have been met by the present invention.

DRAWINGS

Other objects and advantages of the invention will become more apparent upon perusal of the detailed description thereof and upon inspection of the drawings in which.

DETAILS OF INVENTION

Figure 1:
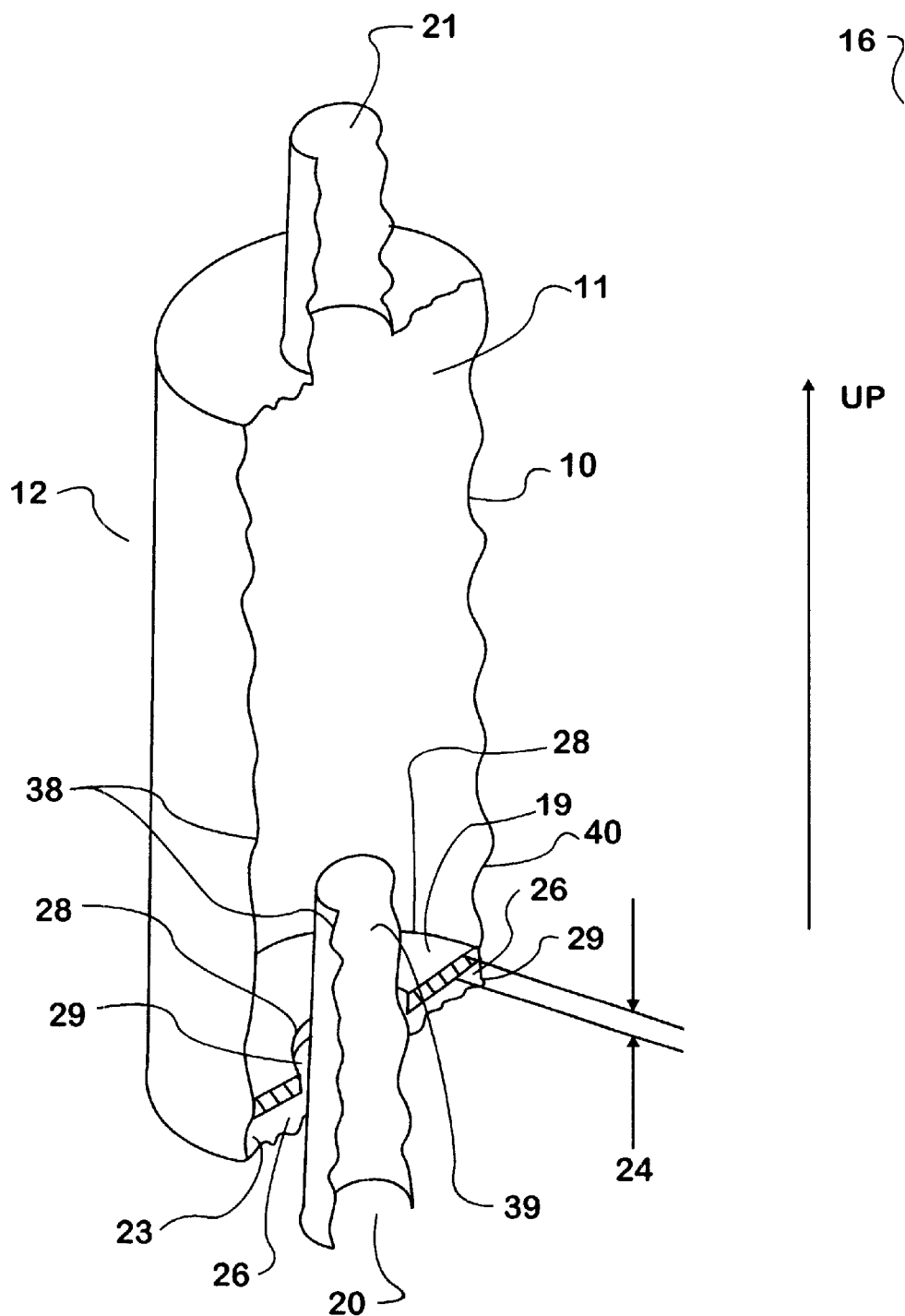
FIG. 1 is a perspective cut-away view of an exhaust system component of vertical flow design with an absorbent liner disposed in the exhaust system component.
Figure 2:
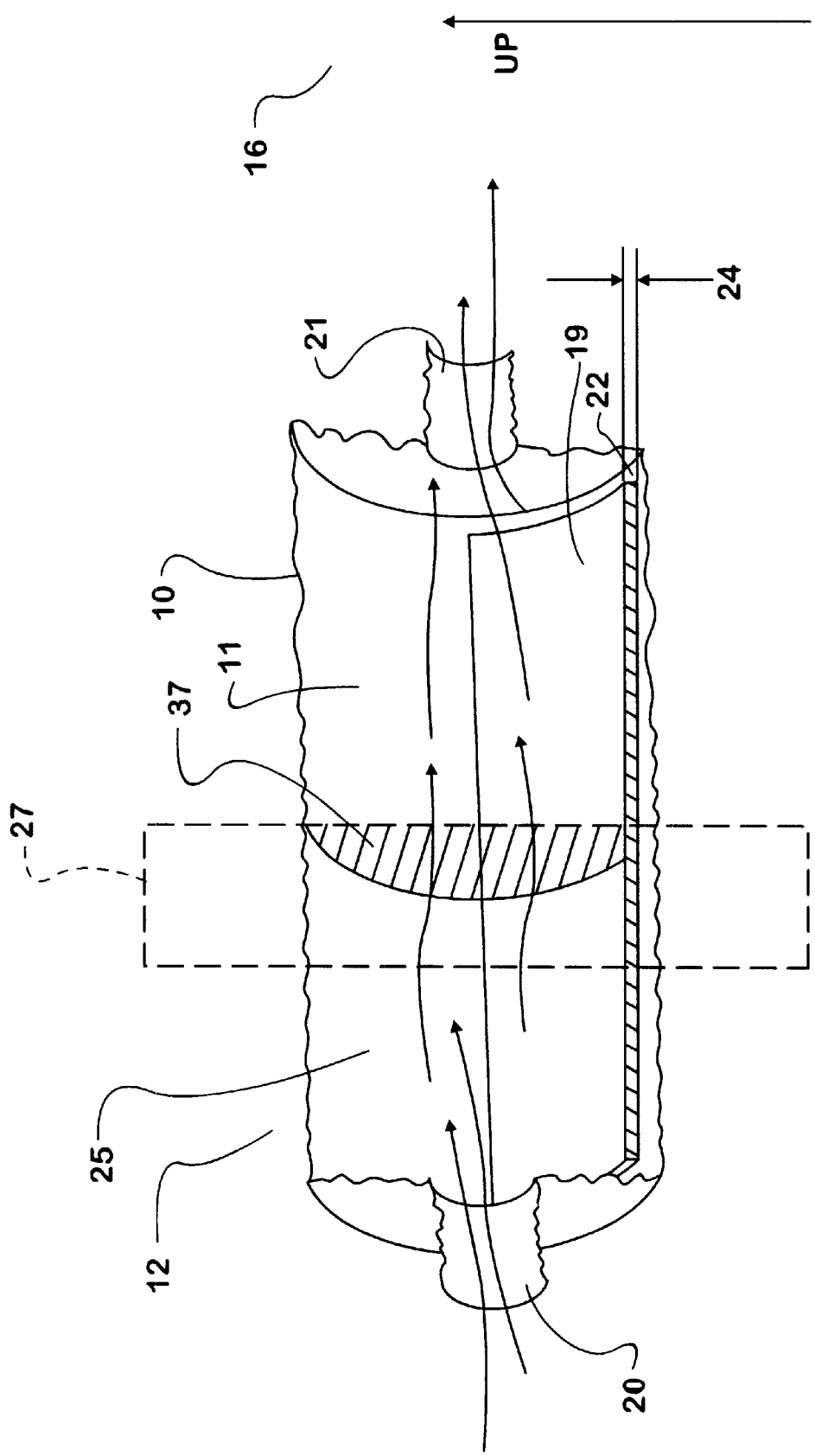
FIG. 2 is a perspective cut-away view of an exhaust system component of horizontal flow design with an absorbent liner disposed in the exhaust system component.
Figure 3:
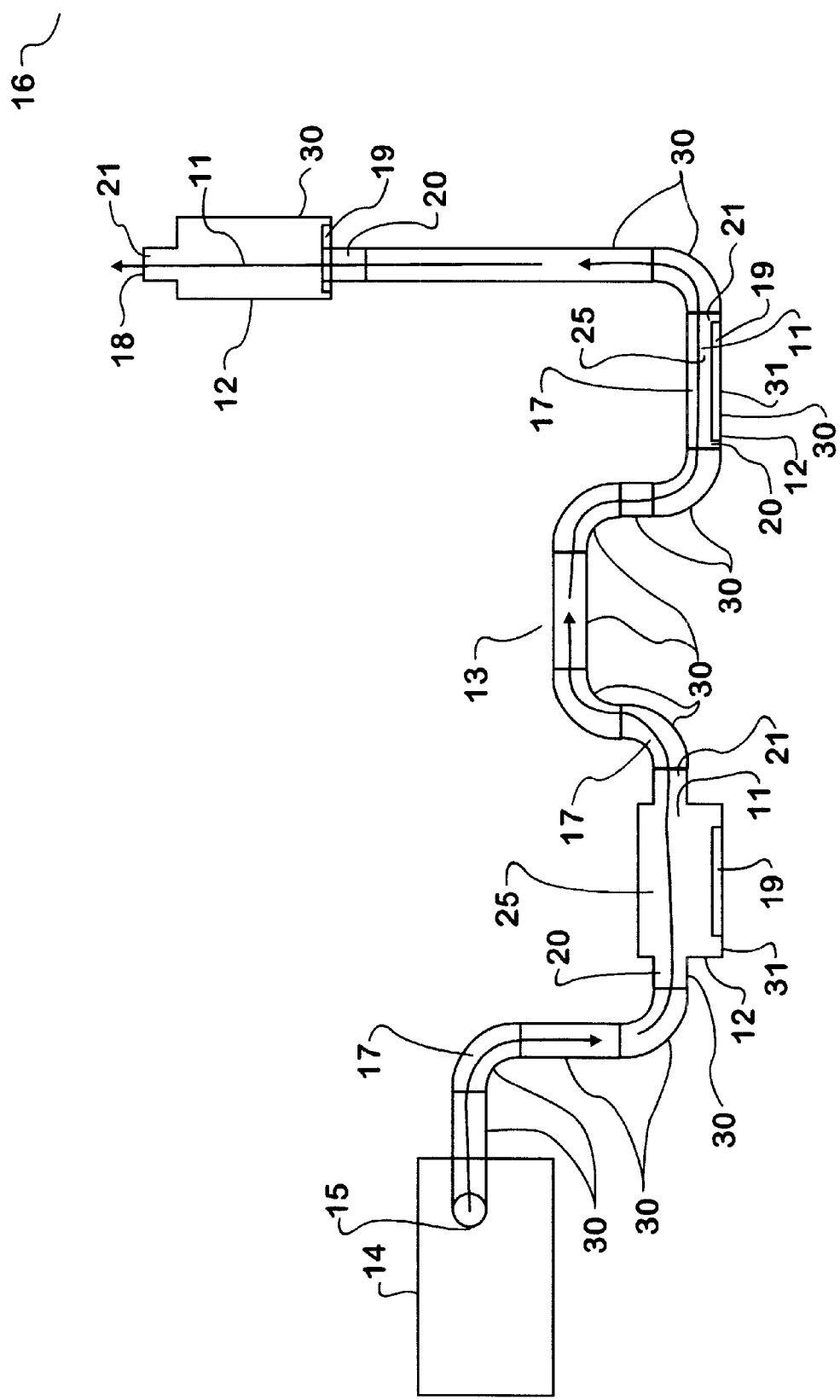
FIG. 3 is a side elevational view of an exhaust system according to the present invention engaged to an internal combustion engine.
Figure 4:
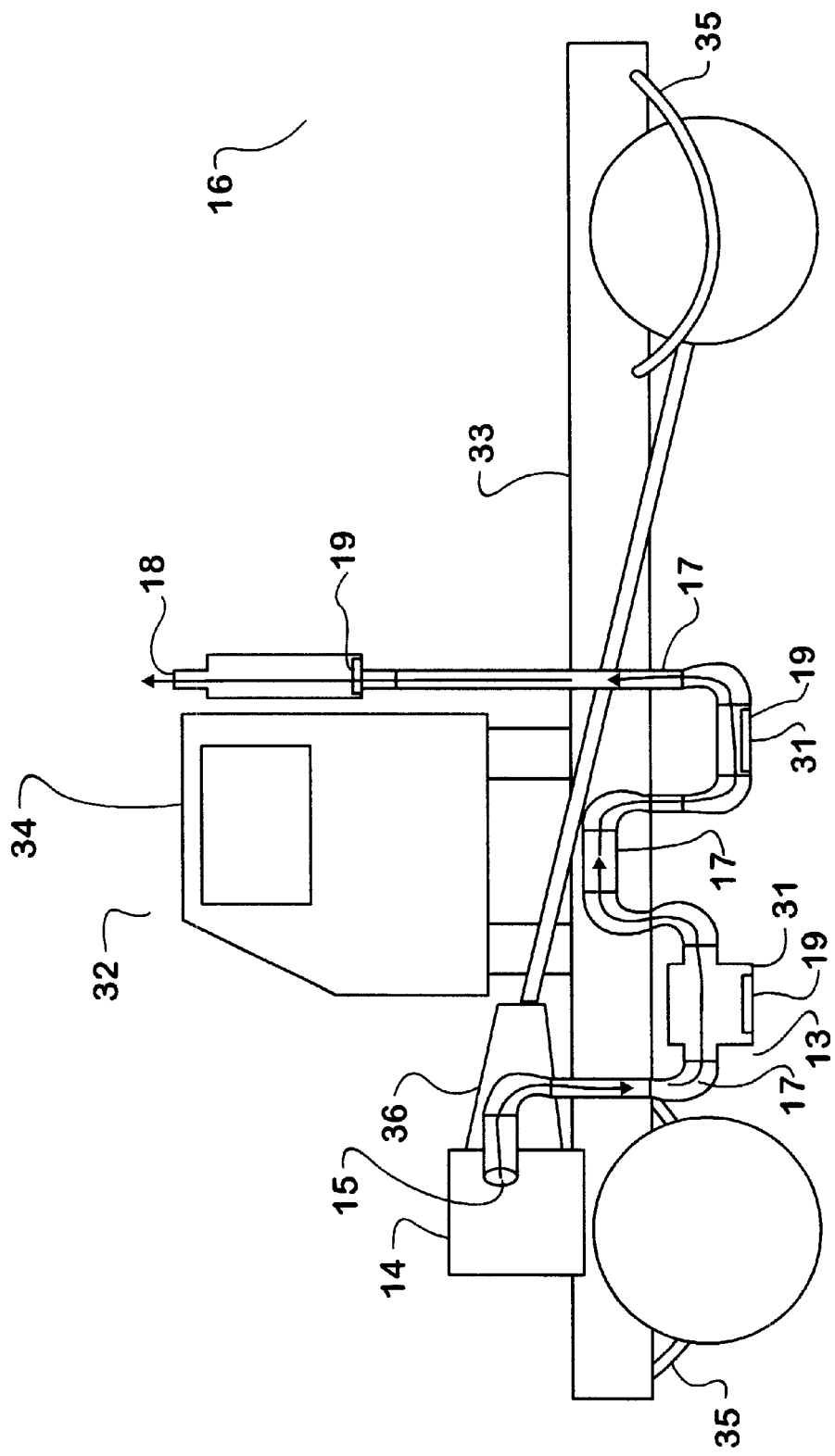
FIG. 4 is a side elevational view of a vehicle with an exhaust system of the present invention engaged to an internal combustion engine of the vehicle.

The present invention includes a moisture absorbing exhaust system component 12, for an exhaust system 13 of an internal combustion engine 14, which is designed to reduce pooling of water within the exhaust system 13. The exhaust system 13, which is shown in FIG. 3, is comprised of one or more components 30. The exhaust system 13 is engaged to an internal combustion engine 14. The one or more components 30 of the exhaust system 13 define a series of passageways 17 through which combustion products travel from an exhaust port 15 of the internal combustion engine 14 to an outlet point 18 of the exhaust system 13 and into atmosphere 16. Each of the one or more exhaust system components 30 may be of a horizontal flow design as shown in FIG. 2 or a vertical flow design as shown in FIG. 1. Exhaust components of a horizontal flow design are designed such that combustion products are intended to flow substantially horizontally between an inlet 20 and an outlet 21 of the exhaust component. Exhaust components of a vertical flow design are designed such that combustion products are intended to flow substantially vertically between an inlet 20 and an outlet 21 of the exhaust component. The moisture absorbing exhaust system component 12 of the present invention is comprised of an exhaust component structure 10, which defines a passageway 11 therethrough. An inlet 20 is disposed at one end of the passageway 11 and an outlet 21 is disposed at an opposite end of the passageway 11. The exhaust component structure 10 of the moisture absorbing exhaust component 12 may be one of many devices including but not limited to mufflers, sections of exhaust pipe, and catalytic convertors. The moisture absorbing exhaust system component 12 is designed to be engaged to others of the one or more components 30 of the exhaust system 13 and/or the internal combustion engine 14. The inlet 20 of the passageway 11 is designed to be engaged to an outlet of another of the one or more components 30 of the exhaust system 13 or the exhaust port 15 of the internal combustion engine 14. The outlet 21 of the passageway 11 may be engaged to an inlet of another of the one or more components 30 of the exhaust system 13. Thus, when the moisture absorbing exhaust system component 12 is properly assembled to the exhaust system 13 the passageway 11 defined by the exhaust component structure 10 is in fluid communication with the exhaust port 15 of the internal combustion engine 14 and atmosphere 16. The passageway 11 may be directly in fluid communication with the exhaust port 15 and atmosphere 16. It may alternatively be in fluid communication with other portions of the series of passageways 17 which other portions of the series of passageways 17 are, in turn, in fluid communication with the exhaust port 15 and atmosphere 16. Thus when the moisture absorbing exhaust system component 12 is assembled to the exhaust system 13 and the internal combustion engine is operational combustion pruducts flow through the passageway 11. An absorbent liner 19 is disposed within said passageway 11 defined in said exhaust component structure 10. The absorbent liner 19 is comprised of a material, which absorbs moisture it comes into contact with. The absorbent liner 19 of the present invention must also be able to withstand the temperature cycles of the moisture absorbing exhaust system component 12 within which it is disposed. The absorbent liner 19 would be exposed to wide ranges of temperatures. The absorbent liner 19 must be able to withstand the temperature cycles for the life of the moisture absorbing exhaust system component 12 without transforming in a manner which would detract substantially from the performance of the absorbent liner 19 or the exhaust system 13. If, for example, the absorbent liner 19 were to combust, melt, or undergo chemical transformation the performance of the exhaust system 13 and/or the absorbent liner 19 would likely be detracted from substantially. The absorbent liner could satisfactorily be comprised of any of a number of different materials which absorb moisture and which would be able to withstand the temperature cycles of the moisture absorbing exhaust system component 12. The absorbent liner 19 could be comprised of asbestos fiber, sand or other materials that meet these criteria. As the absorbent liner 19 absorbs moisture wicking action occurs within the absorbent liner 19 and moisture is pulled away from the point of contact between the absorbent liner 19 and the moisture. The moisture is then distributed throughout the absorbent liner 19. The exhaust system 13 may further contain more than one moisture absorbing exhaust system component 12 with an absorbent liner 19 disposed in its exhaust component structure 10.

The positioning of the absorbent liner 19 within the exhaust component structure 10 impacts how effectively the absorbent liner 19 absorbs moisture present in the exhaust system 13. It is preferred that the absorbent liner 19 be positioned within the exhaust component structure 10 at a point where moisture might otherwise pool. This point, where water might otherwise pool, could be any of a number of places within the exhaust component structure 10, dependent upon the design of the exhaust component structure 10 and the exhaust system 13. In an exhaust component of horizontal flow design water is most likely to pool on a lower surface 22 generally parallel to the flow of combustion products through the passageway 11 of the exhaust component structure 10. Therefore, the absorbent liner 19 would preferably be disposed against a lower surface 22 of an exhaust component structure 10 of horizontal flow design as is shown in FIG. 2. With an exhaust component structure 10 of vertical flow design water is likely to pool on any interior horizontal surfaces 26. Therefore, it is preferred to dispose an absorbent liner 19 against an upper side of one or more of the interior horizontal surfaces 26 of the exhaust component structure 10. FIG. 1 shows an exhaust component structure 10 of vertical flow design with an absorbent liner 19 disposed on a lower horizontal surface 23 where water might otherwise pool.

The size, shape and position of the absorbent liner 19 within the exhaust component structure 10 is also important to minimize restriction to the flow of combustion products through the exhaust system 13. For an exhaust component structure 10 of horizontal flow design as is shown in FIG. 2 it is important that the thickness 24 of the absorbent liner 19 be minimized. By minimizing the thickness 24 of the absorbent liner 19 the size of the open space 25 above the absorbent liner 19, through which combustion products flow, is maximized. It is particularly important that the thickness 24 of the absorbent liner 19 be minimized when the exhaust component structure 10 has a relatively small cross section, as is the case with a section of exhaust tubing. In FIG. 2 a plane 27 that is perpendicular to the flow of combustion products and intersects the absorbent liner 19 is illustrated. An intersection of the open space 25 and any plane parallel to the plane 27 illustrated in FIG. 2 defines a flow area 37 through which combustion products can flow above the absorbent liner 19. It is preferred that the absorbent liner 19 be of such a thickness that all flow areas 37 are at least half as large in terms of physical area as the smallest cross section of the series of passageways 17 which does not include an absorbent liner 19. The inclusion of an absorbent liner 19 of minimized thickness 24 results in a minimal increase in restriction to flow of combustion products through the exhaust system 13 as compared to a similar exhaust system without the absorbent liner 19.

For an exhaust component structure 10 of vertical flow design, as is shown in FIG. 1 the thickness 24 of the absorbent liner 19 is oriented perpendicular to the flow of combustion products. In such an instance, the shape of the absorbent liner 19, as it is looked upon in the direction of flow of the combustion products, is important to minimize restrictions to flow of the combustion products through the exhaust system 13. It is preferred that outer boundaries 28 of any absorbent liner 19 protrude very little if any beyond the outer boundaries 29 of horizontal surfaces 26 which the absorbent liner is disposed against, in directions parallel to the interior horizontal surfaces 26. An absorbent liner 19, which is so shaped, presents very little if any increase in restriction to flow of combustion products as compared to a similar exhaust component structure 10 without the absorbent liner 19.

Accommodations may also be present in the moisture absorbing exhaust system component 12 for maintaining the position of the absorbent liner 19 in horizontal directions. Containment walls 38 may extend at least partially vertically from the horizontal surface that the absorbent liner 19 is disposed against and at least partially surround the absorbent liner 19. These containment walls 38 aid in locating the absorbent liner in horizontal directions. The containment walls 38 may even surround the absorbent liner 19 entirely. It is particularly important that the exhaust component structure 10 of the moisture absorbing exhaust system component 12 have the containment walls 38 when the absorbent liner 19 is comprised of sand. In one embodiment the moisture absorbing exhaust system component 12 is a muffler of vertical flow design and the containment walls 38 are comprised of a portion of inlet tube 39 which protrudes into the exhaust component structure 10 and an outer skin 40 of the muffler. In this embodiment the absorbent liner 19 is contained entirely between the portion of inlet tube 39 which protrudes into the exhaust component structure 10 and the outer skin 40 of the muffler.

Any moisture absorbing exhaust system components 12 remove moisture from the exhaust system 13 more effectively if they are located in certain positions within the exhaust system 13. Water that enters the series of passageways 17 of the exhaust system 13 is most likely to pool in those of the one or more exhaust system components 30, which are lower than others of the one or more components 30 of the exhaust system 13. It is thus preferred that lower components 31 of the exhaust system be designed as a moisture absorbing exhaust system component 12 with an absorbent liner 19 disposed therein.

The exhaust system 13 of the present invention may be engaged to an internal combustion engine 14, which is engaged to a vehicle 32. The vehicle 32 would be comprised of a frame 33. An operator cabin 34, from which a driver of the vehicle 32 drives the vehicle, would be engaged to the frame 33. A suspension 35 for supporting the vehicle 32 is engaged to the frame 33. A powertrain 36, including the internal combustion engine 14, for motivating the vehicle 32 is engaged to the frame 33. The exhaust system 13 of the present invention would be engaged to the internal combustion engine 14 in such a manner that the exhaust port 15 of the internal combustion engine is in fluid communication with the series of passageways 17 of the exhaust system 13.

The inclusion of the absorbent liner 19 within one or more moisture absorbing exhaust system components 12 may also effect the sound emitted by the exhaust system 13 when the internal combustion engine 14 is operated. The size, shape, and positioning of the absorbent liner 19 along with the design of the moisture absorbing exhaust system component 12 in which the absorbent liner 19 is disposed will effect the tuning and noise absorption properties of the exhaust system 13. By designing each moisture absorbing exhaust system component 12 and its absorbent liner 19 to take advantage of the sound altering properties of the absorbent liner 19 the exhaust system 13 may be further improved. Such an exhaust system 13 may produce a more desirable sound and/or be less expensive to produce because of adequate performance with less baffling of one or more mufflers of the exhaust system 13.

Those skilled in the art will appreciate that modifications could be made to the invention as described without departing from the spirit and scope of the invention and thus the scope of the invention is limited only by the following claims.

We claim:

1. A moisture absorbing exhaust system component for an exhaust system through which combustion products flow from an exhaust port of an internal combustion engine to atmosphere, which exhaust system may have other components each of which have an inlet and an outlet, comprising:

(a) an exhaust component structure which defines a passageway therethrough with an inlet at one end of said passageway and an outlet at an opposite end of said passageway;

(b) wherein said exhaust component structure is designed to be engaged to at least one of the internal combustion engine and the other components of the exhaust system such that said inlet of said passageway is designed to be in fluid communication with either an outlet of one of the other components of the exhaust system or the exhaust port of the internal combustion engine, and said outlet of said passageway may be designed to be in fluid communication with the inlet of another component of the exhaust system;

(c) wherein when said moisture absorbing exhaust system component is properly assembled within the exhaust system said passageway defined through said exhaust component structure is in fluid communication with both the exhaust port of the internal combustion engine and atmosphere either directly, or through fluid communication with the other components of the exhaust system which are, in turn, in fluid communication with the exhaust port and atmosphere;

(d) wherein when said moisture absorbing exhaust system component is properly installed to the exhaust system which is engaged to the internal combustion engine and the internal combustion engine is operational the combustion products of the internal combustion engine travel from the exhaust port of the internal combustion engine through said passageway defined in said exhaust component structure and eventually to atmosphere;

(e) an absorbent liner disposed within said exhaust component structure;

(f) wherein said one or more absorbent liners are comprised of a moisture absorbing material which can be subjected to temperature cycles of said moisture absorbing exhaust system component without melting, combusting, undergoing chemical transformation, or otherwise transforming in any manner which would substantially detract from exhaust system performance or performance of said one or more absorbent liners for a normal life of said exhaust system;

(g) wherein said absorbent liner is positioned within said exhaust component structure at a point where water which enters the exhaust system might otherwise pool;

(h) wherein said exhaust component structure is of a vertical flow design; and (i) wherein said absorbent liner is disposed against an upper side of a horizontal surface interior to said exhaust component structure, where water might otherwise pool.

2. The moisture absorbing exhaust system component of claim 1, wherein:

(a) said absorbent liner is shaped such that outer boundaries of said absorbent liner extend very little if any beyond outer boundaries of said horizontal surface interior to said exhaust component structure against which said absorbent liner is disposed in directions parallel to said horizontal surface, such that the flow of combustion products through said moisture absorbing exhaust system component is substantially unimpeded by said absorbent liner.

3. The moisture absorbing exhaust system component of claim 1, further comprising:

(a) containment walls which extend at least partially vertically from said upper side of said horizontal surface interior to said exhaust component structure, against which said absorbent liner is disposed; and (b) wherein said containment walls at least partially surround said absorbent liner such that said containment walls aid in locating said absorbent liner horizontally.

4. The moisture absorbing exhaust system component of claim 3, wherein:

(a) said exhaust component structure is that of a muffler;

(b) said containment walls are comprised of a portion of an inlet tube which protrudes into said exhaust component structure and an outer skin of said exhaust component structure; and (c) said absorbent liner is entirely surrounded between said portion of inlet tube which protrudes into said exhaust component structure and said outer skin of said exhaust component structure.

5. An exhaust system for routing the combustion products of an internal combustion engine from an exhaust port at which the combustion products exit the internal combustion engine to atmosphere, comprising:

(a) one or more components of said exhaust system which are engaged to each other and are designed to be engaged to the internal combustion engine;

(b) wherein said one or more components of said exhaust system define a series of passageways which are in fluid communication with an outlet point of said exhaust system and the exhaust port of the internal combustion engine when said exhaust system is properly assembled and engaged to the internal combustion engine;

(c) wherein when said exhaust system is properly installed to the internal combustion engine and the internal combustion engine is operational the combustion products of the internal combustion engine travel from the exhaust port of the internal combustion engine through said series of passageway defined in said exhaust system and out of said outlet point of said exhaust system into atmosphere;

(d) wherein one or more of said one or more exhaust system components are moisture absorbing exhaust system components within which one or more absorbent liners are disposed;

(e) wherein said one or more absorbent liners are comprised of a moisture absorbing material which can be subjected to temperature cycles of said exhaust system without melting, combusting, undergoing chemical transformation, or otherwise transforming in any manner which would substantially detract from exhaust system performance or performance of said one or more absorbent liners for a normal life of said exhaust system;

(f) wherein each of said one or more absorbent liners is disposed within a respective one of said moisture absorbing exhaust system components in a position where water which enters said series of passageways might otherwise pool;

(g) wherein each of said one or more absorbent liners is of a shape and size and is disposed within a respective one of said moisture absorbing exhaust system components in such a position that the combustion products flow around rather than through said one or more absorbent liners when said exhaust system is properly engaged to the internal combustion engine and the internal combustion engine is operational, and thus said one or more absorbent liners cause minimal restriction to the flow of the combustion products through said exhaust system;

(h) wherein one or more of said one or more moisture absorbing exhaust system components are of a vertical flow design; and (i) wherein each of said absorbent liners, which is disposed within ones of said one or more moisture absorbing exhaust system components which are of a vertical flow design, is disposed against an upper side of a horizontal surface interior to a respective one of said moisture absorbing exhaust system components of vertical flow design, where water might otherwise pool.

6. The exhaust system of claim 5, wherein:

(a) each of said absorbent liners, which is disposed in said moisture absorbing exhaust system components of vertical flow design, is shaped such that outer boundaries of said absorbent liners extend very little if any beyond outer boundaries of a horizontal surface against which said absorbent liner is disposed, such that the flow of combustion products through said moisture absorbing exhaust system component is substantially unimpeded by said absorbent liner.

7. The exhaust system of claim 5, wherein:

(a) one or more of said one or more moisture absorbing exhaust system components are of a vertical flow design; and (b) each of said absorbent liners, which is disposed within ones of said one or more moisture absorbing exhaust system components which are of a vertical flow design, is disposed against an upper side of a horizontal surface interior to a respective one of said moisture absorbing exhaust system components of vertical flow design, where water might otherwise pool.

8. The exhaust system of claim 7, wherein (a) each absorbent liner, which is disposed within ones of said one or more moisture absorbing exhaust system components which are of a vertical flow design, is shaped such that outer boundaries of said absorbent liner extend very little if any beyond outer boundaries of a respective horizontal surface against which said absorbent liner is disposed, in directions parallel to said horizontal surface such that the flow of combustion products through said moisture absorbing exhaust system component is substantially unimpeded by said absorbent liner.

9. The exhaust system of claim 8, wherein
   (a) said one or more components of said exhaust system are comprised of lower components which are disposed physically lower than others of said one or more exhaust system components and in which water is most likely to pool within said series of passageways of said exhaust system; and
   (b) one or more of said moisture absorbing exhaust system components comprise at least a portion of said lower components of said exhaust system.

10. A vehicle, comprising:
    (a) a frame;
    (b) an operator cabin engaged to said frame from which an operator drives said vehicle;
    (c) a powertrain including an internal combustion engine engaged to said frame for moving said vehicle;
    (d) a suspension system engaged to said frame for supporting said vehicle;
    (e) an exhaust system engaged to said internal combustion engine for routing combustion products from an exhaust port of said internal combustion engine to atmosphere;
    (f) wherein said exhaust system is comprised of one or more components which define a series of passageways through said exhaust system and through which combustion products travel between said exhaust port and an exit point of said exhaust system when said internal combustion engine is operational;
    (g) wherein one or more of said one or more components of said exhaust system are moisture absorbing exhaust system components within which one or more absorbent liners are disposed;
    (h) wherein said one or more absorbent liners are comprised of a moisture absorbing material which can be subjected to temperature cycles of said exhaust system for a normal life of said exhaust system without melting, combusting, undergoing chemical transformation, or otherwise transforming in any manner which would substantially detract from exhaust system performance or performance of said one or more absorbent liners;
    (i) wherein each of said one or more absorbent liners is disposed within a respective one of said one or more moisture absorbing exhaust system components in a position where water which enters said series of passageways might otherwise pool;
    (j) wherein each of said one or more absorbent liners is of a shape and size and is disposed within a respective one of said one or more moisture absorbing exhaust system components in such a position that combustion products flow around rather than through said one or more absorbent liners when said exhaust system is properly engaged to said internal combustion engine and said internal combustion engine is operational and thus said one or more absorbent liners cause minimal restriction to the flow of combustion products through said exhaust system;
    (k) wherein one or more of said one or more moisture absorbing exhaust system components are of a vertical flow design; and
    (l) wherein each of said one or more absorbent liners, which is disposed within ones of said one or more exhaust system components which are of a vertical flow design, is disposed against an upper side of a horizontal surface interior to a respective one of said moisture absorbing exhaust system components, where water might otherwise pool.

11. The vehicle of claim 10, wherein:
    (a) each of said absorbent liners, which is disposed in a moisture absorbing exhaust system component of vertical flow design, is shaped such that outer boundaries of said absorbent liner extend very little if any beyond outer boundaries of a respective horizontal surface against which said absorbent liner is disposed, such that flow of combustion products through said moisture absorbing exhaust system component is substantially unimpeded by said absorbent liner.

12. The vehicle of claim 11, wherein:
    (a) one or more of said one or more moisture absorbing exhaust system components are of a vertical flow design; and
    (b) each of said one or more absorbent liners, which is disposed within ones of said one or more moisture absorbing exhaust system components which are of a vertical flow design, is disposed against an upper side of a horizontal surface interior to a respective one of said one or more moisture absorbing exhaust system components where water might otherwise pool.

13. The vehicle of claim 12, wherein:
    (a) each of said one or more absorbent liners, which is disposed within ones of said one or more exhaust system components which are of a vertical flow design, is shaped such that outer boundaries of said absorbent liner extend very little if any beyond outer boundaries of a respective horizontal surface interior to said moisture absorbing exhaust system component against which said absorbent liner is disposed, in directions parallel to said horizontal surface such that flow of combustion products through said moisture absorbing exhaust system component is substantially unimpeded by said absorbent liner.

14. The vehicle of claim 13, wherein:
    (a) said one or more components of said exhaust system are comprised of lower components which are disposed physically lower than others of said one or more exhaust system components and in which water is most likely to pool within said series of passageways of said exhaust system; and
    (b) one or more of said moisture absorbing exhaust system components comprise at least a portion of said lower components of said exhaust system.

* * * * *